(12) United States Patent
Zhang et al.

(10) Patent No.: US 12,015,606 B2
(45) Date of Patent: Jun. 18, 2024

(54) VIRTUAL MACHINE PROVISIONING AND DIRECTORY SERVICE MANAGEMENT

(71) Applicant: Microsoft Technology Licensing, LLC, Redmond, WA (US)

(72) Inventors: Yan Zhang, Suzhou (CN); Xuling Luo, Suzhou (CN); Honglu Chen, Suzhou (CN); Yizhong Wu, Shanghai (CN); Christian Cruz Montoya, San Diego, CA (US); Jun Shi, Redmond, WA (US); Na Li, Bellevue, WA (US); Prasanna Chromepet Padmanabhan, Redmond, WA (US); Somesh Goel, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 17/373,542

(22) Filed: Jul. 12, 2021

(65) Prior Publication Data

US 2022/0417240 A1    Dec. 29, 2022

Related U.S. Application Data

(63) Continuation of application No. PCT/CN2021/102637, filed on Jun. 28, 2021.

(51) Int. Cl.
*H04L 9/40*    (2022.01)
*G06F 9/455*   (2018.01)

(52) U.S. Cl.
CPC ...... *H04L 63/0853* (2013.01); *G06F 9/45558* (2013.01); *H04L 63/10* (2013.01);
(Continued)

(58) Field of Classification Search
CPC . H04L 63/0853; H04L 63/10; G06F 9/45558; G06F 2009/4557; G06F 2009/45595
See application file for complete search history.

(56) References Cited

U.S. PATENT DOCUMENTS 10,382,202 B1 *  8/2019  Ohsie .................. H04L 63/0807
11,632,360 B1 *  4/2023  Tan ....................... G06F 3/0622
                                                              726/4
(Continued)

FOREIGN PATENT DOCUMENTS

WO        2013174437 A1    11/2013

OTHER PUBLICATIONS

"BPRT unleashed: Joining multiple devices to Azure AD and Intune", Retrieved from: https://o365blog.com/post/bprt/, Jan. 31, 2021, 24 Pages.
(Continued)

*Primary Examiner* — Stephen T Gundry
(74) *Attorney, Agent, or Firm* — Schwegman Lundberg & Woessner, P.A.

(57) ABSTRACT

A computer implemented method includes granting a tenant administrator client machine access to a cloud hosted tenant service joined to a directory service. A bulk token for the tenant is obtained in response to a request received from the tenant administrator client machine. An identifier of an authorized tenant client to the cloud hosted tenant service is received and results in the provisioning of a tenant client virtual machine in a cloud service for the authorized tenant client in accordance with a specified provisioning package associated with the bulk token. The tenant client virtual machine is then joined to the directory service. On receipt of an authorized client token at the cloud hosted tenant service from a tenant client machine, the tenant client machine is provided a connection to the tenant client virtual machine.

20 Claims, 5 Drawing Sheets

(52) U.S. Cl.
CPC .............. *G06F 2009/4557* (2013.01); *G06F 2009/45595* (2013.01)

(56) References Cited

U.S. PATENT DOCUMENTS

| | | | | |
|---|---|---|---|---|
| 2015/0067677 | A1* | 3/2015 | Naseh | H04L 41/5041 718/1 |
| 2017/0149780 | A1* | 5/2017 | Tellvik | H04L 63/0807 |
| 2018/0018745 | A1* | 1/2018 | Lisanti | G06Q 50/184 |
| 2018/0034817 | A1* | 2/2018 | Milton | H04L 63/0807 |
| 2021/0097531 | A1* | 4/2021 | Shimizu | H04L 63/102 |
| 2022/0198267 | A1* | 6/2022 | Rama | G06V 10/82 |
| 2022/0334725 | A1* | 10/2022 | Mertes | G06F 16/275 |
| 2022/0345492 | A1* | 10/2022 | Wu | H04L 63/20 |
| 2022/0353139 | A1* | 11/2022 | Brems | H04L 67/53 |
| 2022/0368528 | A1* | 11/2022 | Vennapusa | H04L 9/3073 |
| 2022/0374599 | A1* | 11/2022 | Deshmukh | G06F 21/6263 |
| 2022/0385477 | A1* | 12/2022 | Kravitz | H04L 9/3247 |
| 2022/0413885 | A1* | 12/2022 | Padmanabhan | G06F 9/452 |
| 2023/0025716 | A1* | 1/2023 | Miller | H04L 63/1416 |
| 2023/0052525 | A1* | 2/2023 | Frederick | H04L 63/10 |
| 2023/0111855 | A1* | 4/2023 | Koren | H04L 63/0861 715/762 |
| 2023/0121372 | A1* | 4/2023 | Dasari | H04L 63/104 726/1 |

OTHER PUBLICATIONS

"Configuring options to run your container", Retrieved from: https://cloud.google.com/compute/docs/containers/configuring-options-to-run-containers, Feb. 4, 2021, 10 Pages.

"OS configuration management (beta)", Retrieved from: https://web.archive.org/web/20210519095335/https://cloud.google.com/compute/docs/os-config-management, May 19, 2021, 3 Pages.

Kjerland, et al., "Bulk enrollment for Windows devices", Retrieved from: https://docs.microsoft.com/en-us/mem/intune/enrollment/windows-bulk-enroll, Nov. 24, 2020, 7 Pages.

Lindsay, et al., "Manually register devices with Windows Autopilot", Retrieved from: https://docs.microsoft.com/en-us/mem/autopilot/add-devices, Mar. 16, 2021, 7 Pages.

Serafine, Mark, "Preparing to Manage Windows Virtual Desktops (WVD)", Retrieved from: https://techcommunity.microsoft.com/t5/core-infrastructure-and-security/preparing-to-manage-windows-virtual-desktops-wvd/ba-p/2032984, Jan. 6, 2021, 14 Pages.

"International Search Report and Written Opinion Issued in PCT Application No. PCT/CN21/102637", dated Dec. 6, 2021, 13 Pages.

* cited by examiner

VIRTUAL MACHINE PROVISIONING AND DIRECTORY SERVICE MANAGEMENT

CLAIM OF PRIORITY

The present patent application is a continuation of and claims the priority benefit of the filing date of the PCT Application No. PCT/CN2021/102637, filed. Jun. 28, 2021, the entire content of which is incorporated herein by reference.

BACKGROUND

In cloud-based computing environments, cloud-based computer services may be provided to a tenant that does not have their own computing infrastructure. All services are managed in a cloud environment with a cloud-based directory service managing storage of information and access rights to users of the tenant. Many users utilize personal computers and other smart devices to access the cloud environment. The users provide credentials to obtain such access which is authorized by the directory service.

Setting up or provisioning virtual computers for users can be a time-consuming endeavor, with system administrators having to manually create and distribute provisioning packages, which may not be secure. An end user still needs to perform interactive actions before the virtual computer is ready for use.

Such interactive actions are highly inefficient from a system point of view, increasing network traffic and requiring additional access control actions, as well as increasing security risks.

SUMMARY

A computer implemented method includes granting a tenant administrator client machine access to a cloud hosted tenant service joined to a directory service. A bulk token for the tenant is obtained in response to a request received from the tenant administrator client machine. An identifier of an authorized tenant client to the cloud hosted tenant service is received and results in the provisioning of a tenant client virtual machine in a cloud service for the authorized tenant client in accordance with a specified provisioning package associated with the bulk token. The tenant client virtual machine is then joined to the directory service. On receipt of an authorized tenant client token at the cloud hosted tenant service from a tenant client machine, the tenant client machine is provided a connection to the tenant client virtual machine.

DETAILED DESCRIPTION

Figure 1:
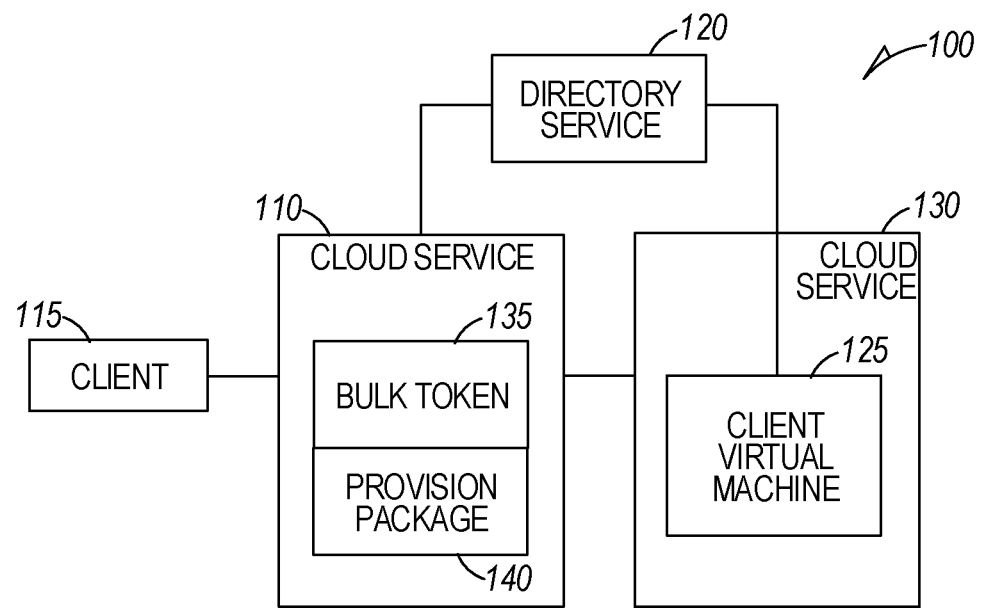
FIG. 1 is a block diagram of a system for providing a first cloud service to tenant clients and corresponding tenant client virtual machines in a second cloud service to the clients according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Some enterprises utilize an entirely cloud based information technology infrastructure for providing computing services to users. The enterprise may be any business, organization, or group of any size with on-line identities and is referred to as a tenant. The tenant may contract with a cloud-based service provider to create a tenant cloud service that is accessed by users. Provisioning of virtual computers for use by the users of an enterprise can involve a manual process for each worker. The virtual computers may be provided under a second license and are provided by a different cloud service. Each such virtual computer is manually set up by the administrator in a time and effort intensive manner. Such a set up typically involves logging into a current virtual machine without a trusted platform, then registering with a directory service, then registering with the tenant, and then obtaining a configuration package.

The present inventive subject matter makes use of a bulk token for use by a system to create and provision virtual machines for clients of a tenant. After first obtaining the bulk token in associating with configuring a client virtual machine for a first tenant client, the bulk token can be used by the system to automatically initiate the creation, provisioning with a specified provisioning policy, and the joining of additional client virtual machines to a directory service, allowing ease of secure access by tenant client machines to their respective virtual machines in a trusted manner with very little system overhead and minimal to no burden on the clients.

FIG. 1 is a block diagram of a system 100 for providing a cloud service 110 to one or more client machines 115 for use by tenant clients. The client machines 115 may be used by users of a subscriber organization referred to as a tenant. Client machines 115 can also be used by tenant administrators that may be users that have a system administration level of access to perform typical system administrative functions. The tenant may have a license for a subscription to multiple services provided by the cloud service 110. Cloud service 110 may provide the tenant its own domain.

Access by client machines 115 to the cloud service 110 may be authorized by a directory service 120. Directory service 120 provides access control to services and stored data. One example of directory service 120 is Microsoft's Azure Active Directory (AAD.) Client machines 115 may provide a token, such as a user identifier and a password to obtain access.

In one example, client machine 115 may be used by a tenant administrator that is responsible for helping set up other users with access to the cloud service 110, such as Azure cloud services. The tenant administrator may receive a request for a client virtual machine 125 which is provided by yet a further cloud service 130 in a cloud service domain. Cloud service 130 may utilize yet a further license to provide a second subscription for one or more client virtual machines 125.

To set up a client virtual machine 125, the tenant administrator may provide a token via a client machine 115 to a portal to gain access to cloud service 110. The tenant administrator, via the client machine 115, will then request a bulk token 135 and also create or otherwise obtain a provisioning package 140. The bulk token 135 may be obtained from the directory service 120 and is a unique binary number associated with the tenant. Once the bulk token and provisioning package are obtained, the tenant administrator can identify one or more tenant clients, such as users that are authorized under the second subscription for a virtual machine. Cloud service 110 will then automatically create and provision a client virtual machine for each authorized tenant client using the same bulk token provisioning package.

Each client virtual machine will then be automatically joined with the directory service 120. Joining may be done by joining domains so that a client logging in to one domain will have access to all joined domains. Joining domains was originally introduced in Microsoft Windows 7. Once the virtual machine is ready, it is assigned to the licensed client. The first time the client logs on via the portal to access their virtual machine, the virtual machine is ready and available to use.

Figure 2:
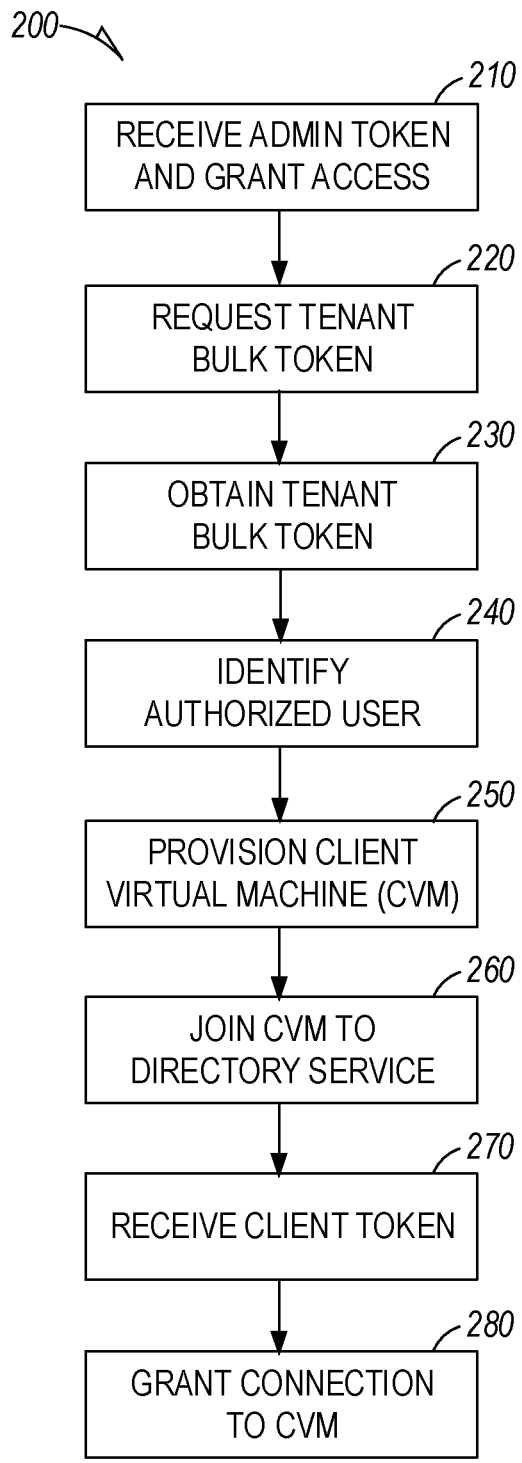
FIG. 2 is a flowchart of a method of providing client virtual machines to authorized clients according to an example embodiment.

FIG. 2 is a flowchart of a method 200 of providing client virtual machines to authorized tenant clients in an efficient manner. Method 200 begins at operation 210 by receiving a tenant administrator token from a tenant administrator client machine. Access is granted to a cloud hosted tenant service in response to receiving the tenant administrator token. The cloud hosted tenant service is joined to a directory service that manages access to the cloud hosted tenant service. The directory service authenticates and authorizes access based on tokens.

At operation 220, a request for a bulk token is received from the tenant administrator client machine. In one example, the request for the bulk token is used to request the bulk token from the directory service. The bulk token is obtained at operation 230 from the directory service.

At operation 240, an identifier of an authorized tenant client of the cloud hosted tenant service is received. The tenant administrator may provide the identifier via the client machine, in response to the tenant client having a license for the cloud hosted tenant service, and a license to a client virtual machine.

The client virtual machine is provisioned in a cloud service at operation 250 in accordance with a specified provisioning package associated with the bulk token. The tenant administrator may select or create the specified provisioning package. The cloud service may associate or include the bulk token with the provisioning package.

At operation 260, the client virtual machine is joined to the directory service to provide the tenant client access to the client virtual machine upon using the client machine to access the cloud hosted tenant service. The client virtual machine may be managed within the cloud service by virtue of being joined to the directory service. In addition, the directory service may be used to manage access to stored information and deployment of services.

Joining the client virtual machine to the directory service may include providing a connection between the client virtual machine and the directory service for providing directory service functions to the client virtual machine. Such a connection allows management of the client virtual machine using the directory service.

Once the client virtual machine is joined, an authorized client token may be received from the client machine at the cloud hosted tenant service at operation 270. In one example the authorized client token comprises a user identifier and password. The authorized client token is used to grant access to the cloud hosted tenant service to the client device, provided a user of the client device is licensed to the cloud hosted tenant service. At operation 280, the client machine is granted a connection to the client virtual machine by virtue of the client virtual machine having been joined to the directory service.

In one example, the bulk token comprises a unique binary string and may be used to help authorize and provision multiple client virtual machines for multiple clients of the tenant. Such provisioning may be done using the already created bulk token by receiving multiple additional identifiers. Each identifier corresponds to a respective one of multiple additional authorized tenant clients of the cloud hosted tenant service. Multiple additional respective client virtual machines are then provisioned in the cloud service in accordance with the specified provisioning package associated with the bulk token. Each of the client virtual machines are then joined to the directory service, enabling each client machine to simply obtain access to the cloud hosted tenant service to obtain access to their client virtual machine.

The bulk token may be encrypted within the cloud hosted platform. While the bulk token is only shared within the cloud based systems and used to provision client virtual machines, encrypting the bulk token is helpful in the unlikely event of an unauthorized access or unauthorized access attempt. The bulk token may also be included in the provisioning package.

Receiving an authorized tenant client token at the cloud hosted tenant service at operation 270 and providing a connection at operation 280 is performed in response to a client being confirmed as having a license to the cloud hosted tenant service. In one example, the authorized tenant client may use the client machine to provide the authorized client token of a user included in the license. The client machine may be coupled to a portal website providing access to the cloud hosted tenant service.

Figure 3:
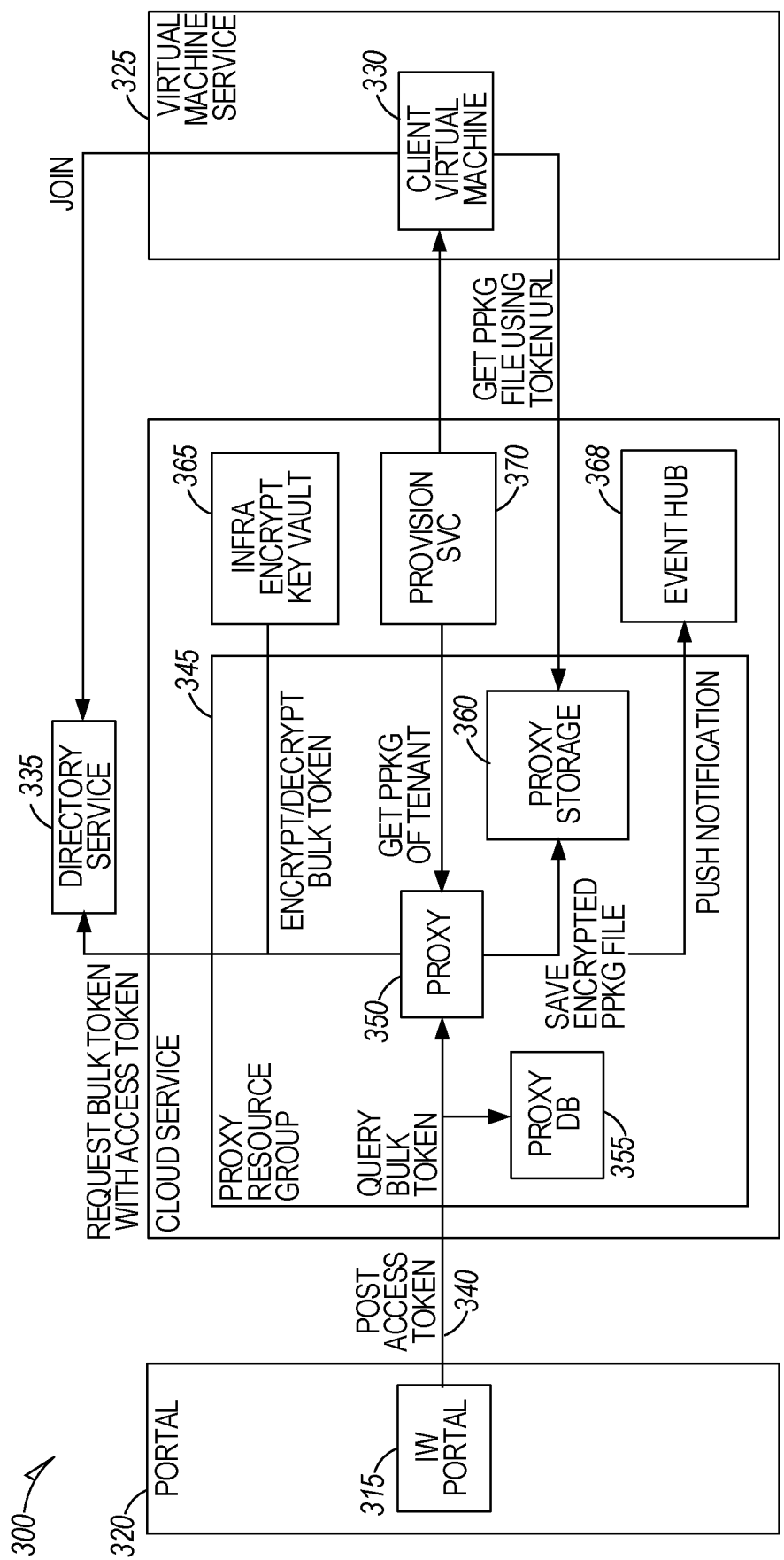
FIG. 3 is a block flow diagram of a system for provisioning client virtual machines for multiple tenant clients according to an example embodiment.

FIG. 3 is a detailed block flow diagram of a system 300 for provisioning client virtual machines for multiple tenant clients. The elements of system 300 may be provided by cloud-based services in one example. System 300 is suitable for enterprises, referred to as tenants, that do not have their own information technology infrastructure.

In one example, system 300 includes a cloud hosted tenant service 310 that provides software services to the tenant. The cloud hosted tenant service 310 may include computing resources, such as processors, memory, and programming to provide services. Tenant clients 315, such as information workers, having subscriptions to the cloud hosted tenant service 310 may utilize devices such as client machines, also represented at 315, that are capable of running a browser or other software to access a web portal 320 for the tenant. The web portal 320 allows tenant clients having subscriptions, such as authorized users, to log into subscriber accounts using their devices 315. Logging in via the web portal 320 provides access to utilize the services of the cloud hosted tenant service 310.

System 300 may also include a cloud virtual machine service 325 that provides computing resources for generating a client virtual machine 330 for each tenant client. As each client virtual machine is created and provisioned, the client virtual machine is joined with a directory service 335, such as Microsoft Azure active directory services. The tenant service 310 is also joined with the directory service 335. The directory service may provide access control and other services such as those services provide by Azure active directory services. As each cloud service may provide a tenant its own domain, the joining may be done by a domain join to allow tenant client and tenant administrators access to each domain via the use of a single token. The token may be a user or client id, and a password in one example.

The above description of system 300 assumes that the client virtual machine 330 has already been provisioned and joined to directory service 335. FIG. 3 also shows elements of the tenant cloud service 310 that operate to assist with the initial provisioning of the client virtual machine 330 for a tenant client.

In one example, client 315 is a machine used by a tenant administrator. A tenant administrator for a tenant is generally responsible for setting up computing resources for tenant clients, such as employees, systems, or other authorized users for the tenant. As indicated above, each client 315 may have a subscription to the tenant cloud service 310 and post an access token at 340 for access via the portal 320.

The tenant administrator has the ability to access a set of application services 345, which serves as a proxy resource group for interfacing with the directory service 335 to perform administrative tasks. In one example, the application services 345 include a proxy service 350, a proxy database 355 that stores bulk tokens, and a proxy storage 360.

The tenant administrator may request a bulk token from a proxy service 350 in response to a first tenant client being approved for a client virtual machine 330. The proxy service 350 may interface with the directory service 335 to authenticate the tenant administrator and to request the bulk token. On receiving the bulk token from the directory service 335, the bulk token may be encrypted using a key from an encryption key vault 365 and stored in proxy database 355. The bulk token may be a unique binary string that may be used to join the virtual machine 330, once created and provisioned, to the directory service 335. On receiving the bulk token, a push notification is provided to an event hub 368. The same bulk token may also be used for additional tenant clients in the creation, provisioning, and joining additional client virtual machines.

Once the bulk token is created, the proxy service 350 creates a provision package with the bulk token for the tenant. The provision package describes the computer resources for creating and provisioning the client virtual machine 330.

The provision package is provided to a provisioning service 370 in response to the push notification being provided to an event hub 368. The event hub 368 is a message notification service for the provisioning service 370 to kick off provisioning once the bulk token is ready. The provisioning service 370 proceeds to create and provision the client virtual machine 330 and uses the bulk token to request the directory service 335 to join with the client virtual machine 330. The provisioning package may also be encrypted. The provisioning package may be stored in proxy storage 360 for use in setting up additional client virtual machines for additional tenant clients.

In response to an additional client being added to the cloud virtual machine service 325 subscription, the provisioning package may be used to automatically create, provision, and join an additional corresponding client virtual machine 330. In one example, the client virtual machine 330 may be provisioned to operate like a personal computer for the client and may be thought of as a cloud personal computer (CPC). Services provisioned may include email, word processing software, office type software, applications, and any other desired software that each tenant client may utilize in performing work for the tenant.

Once each client virtual machine is created, provisioned, and joined, a tenant client machine 315 may be used to access the client virtual machine simply by providing a tenant client token via the portal 320. The tenant client machine 315 will be directly coupled to the client's client virtual machine 330 without having to perform any setup or provide any additional credentials in one example.

Figure 4:
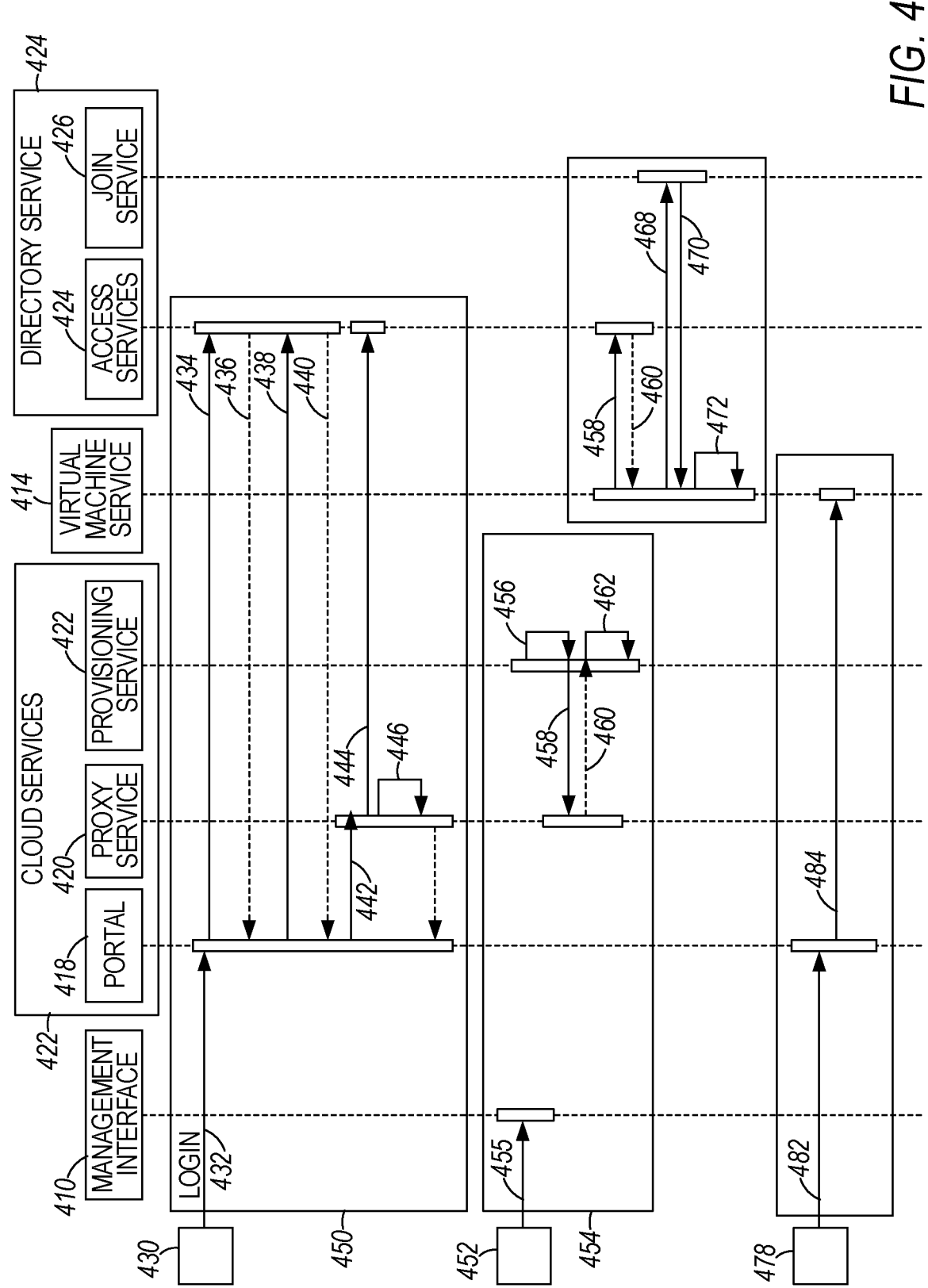
FIG. 4 is a sequence diagram illustrating data flow for creating, provisioning, and joining client virtual computers according to an example embodiment.

FIG. 4 is a sequence diagram 400 illustrating data flow for creating, provisioning, and joining client virtual computers. Diagram 400 also illustrates ease of tenant client machines in accessing corresponding client virtual computers. A top row in FIG. 4 illustrates devices that receive data that is flowing. Such devices perform functions as a result of receiving data and include a management interface 410, the cloud hosted tenant service 412, the cloud virtual machine service 414, and the directory service 416. Also shown in the cloud hosted tenant service 412 are the portal 418, proxy service 420, and provisioning service 422. The directory service 416 includes an access service 424 and a join service 426.

Data flow may begin with a tenant administrator client machine 430 providing a tenant administrator access token at 432 via portal 418. The portal 418 provides the access token at 434 to the access service 424 or directory service 416 to gain tenant administrator, via client machine 430, access in the form of an audience with the directory service for performing administrative functions. The audience is granted at 436 with a directory service access token.

At 438, the tenant administrator via client machine 430 will provide data to retrieve an access token with audience, which is granted at 440. At this point, the tenant administrator is authorized to access the proxy service 420 at 442 via client machine 430 by providing both the directory service access token and the access token with audience and does so at 442 by calling the proxy service 420.

The proxy service 420 retrieves at 444 a bulk token from access service 434 of directory service 416. At 446, the proxy service 420 persists the bulk token with an encryption id such as a PKId and other metadata that identifies the tenant. A status of created is provided at 448 back to the portal 418 where it is visible to the tenant administrator via client machine 430. The above data flow, as indicated by enclosure 450 has thus created a bulk token that is unique to the tenant and can be used to begin provisioning client virtual computers.

Once the bulk token has been created, the tenant administrator via client machine 452 can begin the process of identifying clients that are licensed for a client virtual computer at 454 and initiate the provisioning of such client virtual computers. At this point, the tenant administrator via client machine 452 uses the management interface 410 for the cloud hosted tenant service 412 to identify at 455 a first tenant client, and other clients, that are also licensed for a client virtual computer.

At 456, the provisioning service 422 is notified regarding the identification of a client that is licensed. The notification 456 may be in the form of a policy change. The proxy service 420 sends a request at 458 to obtain the provisioning package for the client virtual machine. As described above, the provisioning package includes identification of computing resources. The provisioning package is retrieved at 458 for the proxy service 420.

The proxy service 420 adds the bulk token to the provisioning package and returns the provisioning package with bulk token at 460 to the provisioning service 422. The provisioning service 422 than proceeds to provision the client virtual machine at 462.

Data flow to join the client virtual machine is outlined within enclosure 463. Once provisioned, the client virtual machine provides the bulk token at 464 to the access service 424 of directory service 416. An access token for the join service 426 is provided at 466 in return. The access token for the join is then provided by the client virtual machine 414 to the join service 426, which proceeds to provide a device directory service certificate at 470 to the client virtual machine 414 to join the client virtual machine the directory service 416. and is ready for use by the first tenant client. Metadata transferred to the client virtual machine required to perform the join is removed at 472.

Access by the first tenant client via client device 478 is illustrated within enclosure 480 and begins by the first tenant client providing login credentials in the form of a tenant client access token at 482 via client device 478 using the portal 418. The portal 418 provides a connection 484 to the client virtual machine 414. The connection 418 may be made without requiring any further setup by either the tenant administrator or the tenant client client machine 478. While the creation, provisioning, and joining of the client virtual machine for the first tenant client involves obtaining the bulk token and adding the bulk token to the provisioning package, the addition of further tenant clients and corresponding client virtual machines can happen automatically upon identification of further tenant clients at 455 by the tenant administrator.

Figure 5:
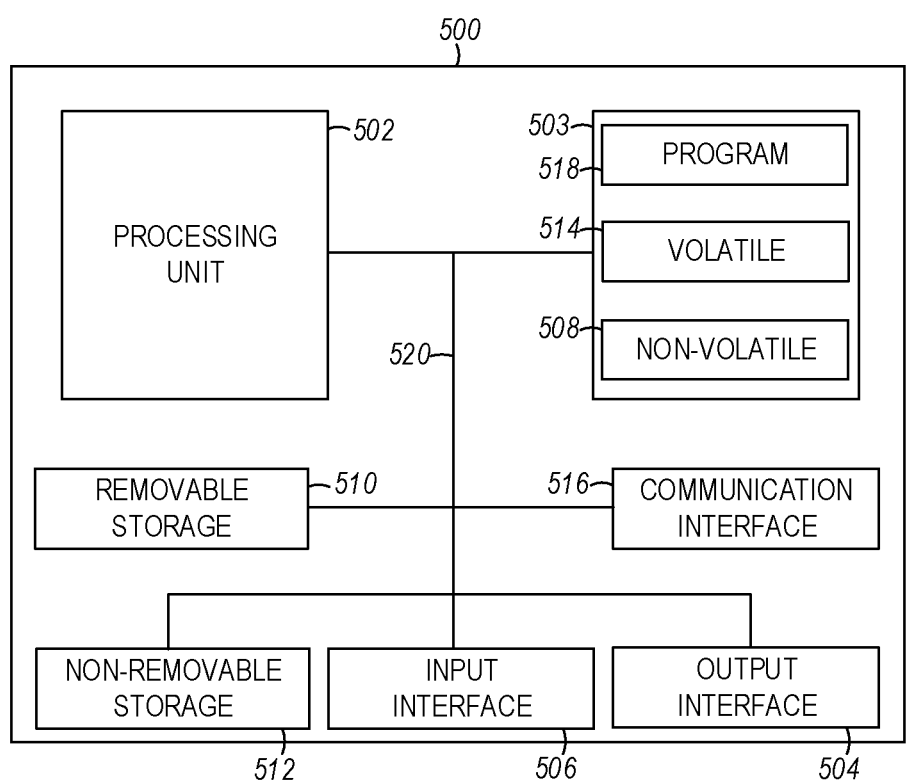
FIG. 5 is a block schematic diagram of a computer system to implement one or more example embodiments.

FIG. 5 is a block schematic diagram of a computer system 500 for use as devices and cloud computing resources for the delivery of services and provisioning and joining of client virtual computers. System 500 also may be used to perform methods and algorithms according to described examples. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

EXAMPLES

1. A computer implemented method includes granting a tenant administrator client machine access to a cloud hosted tenant service joined to a directory service, receiving a request for a bulk token from the tenant administrator client machine, obtaining the bulk token from the directory service, receiving an identifier of an authorized tenant client of the cloud hosted tenant service, provisioning a tenant client virtual machine in a cloud service for the authorized tenant client in accordance with a specified provisioning package associated with the bulk token, and joining the tenant client virtual machine to the directory service. The bulk token may be used to automatically initiate the creation, provisioning with a specified provisioning policy, and the joining of additional client virtual machines to a directory service, allowing ease of access by clients to their respective virtual machines with very little administrative overhead and minimal burden on the clients.

2. The method of example 1 and further including receiving an authorized tenant client token at the cloud hosted tenant service from a tenant client machine, and granting the tenant client machine a connection to the client virtual machine.

3. The method of example 2 wherein the client token comprises the identifier and a password.

4. The method of any of examples 1-3 wherein the tenant client virtual machine is managed within the cloud service.

5. The method of any of examples 1-4 wherein the directory service authenticates and authorizes access based on tokens.

6. The method of any of examples 1-5 wherein the bulk token comprises a unique binary string.

7. The method of any of examples 1-6 and further including receiving multiple additional identifiers, each identifier corresponding to a respective one of multiple additional authorized tenant clients of the cloud hosted tenant service, provisioning multiple additional respective tenant client virtual machines in the cloud service in accordance with a specified provisioning package associated with the bulk token, and joining the tenant client virtual machines to the directory service.

8. The method of any of examples 1-7 wherein the bulk token is encrypted within the cloud hosted platform.

9. The method of any of examples 1-8 wherein the provisioning package includes the bulk token.

10. The method of any of examples 1-9 wherein receiving an identifier of an authorized tenant client of the cloud hosted tenant service is performed in response to a tenant client being confirmed as having a license to services in the specified provisioning package.

11. The method of example 10 wherein the authorized tenant client comprises a device providing the authorized tenant client token of a user included in the license.

12. The method of example 11 wherein the device is coupled to a portal website providing access to the cloud hosted tenant service.

13. The method of any of examples 1-12 wherein joining the tenant client virtual machine to the directory service comprises providing a connection between the client virtual machine and the directory service for providing directory service functions to the tenant client virtual machine.

14. A machine-readable storage device has instructions for execution by a processor of a machine to cause the processor to perform operations to perform a method. The operations include granting a tenant administrator client machine access to a cloud hosted tenant service joined to a directory service, receiving a request for a bulk token from the tenant administrator client machine, obtaining the bulk token from the directory service, receiving an identifier of an authorized tenant client of the cloud hosted tenant service, provisioning a tenant client virtual machine in a cloud service for the authorized tenant client in accordance with a specified provisioning package associated with the bulk token, and joining the tenant client virtual machine to the directory service.

15. The device of example 14 wherein the operations further include receiving an authorized tenant client token at the cloud hosted tenant service from a tenant client machine, and granting the tenant client machine a connection to the client virtual machine.

16. The device of any of examples 14-15 wherein the directory service authenticates and authorizes access based on tokens, wherein the director service manages storage of information and deployment of services and wherein the bulk token comprises a unique binary string.

17. The device of any of examples 14-16 wherein the operations further include receiving multiple additional identifiers, each identifier corresponding to a respective one of multiple additional authorized tenant clients of the cloud hosted tenant service, provisioning multiple additional respective tenant client virtual machines in the cloud service in accordance with a specified provisioning package associated with the bulk token, and joining the tenant client virtual machines to the directory service.

18. The device of any of examples 14-17 wherein the provisioning package includes the bulk token, wherein receiving an identifier of an authorized tenant client of the cloud hosted tenant service is performed in response to a tenant client being confirmed as having a license to services in the specified provisioning package, wherein the authorized tenant client comprises a device providing the authorized tenant client token of a user included in the license, and wherein the device is coupled to a portal website providing access to the cloud hosted tenant service.

19. The device of any of examples 14-18 wherein joining the tenant client virtual machine to the directory service comprises providing a connection between the client virtual machine and the directory service for providing directory service functions to the tenant client virtual machine.

20. A device includes a processor and a memory device coupled to the processor and having a program stored thereon for execution by the processor to perform operations. The operations include granting a tenant administrator client machine access to a cloud hosted tenant service joined to a directory service, receiving a request for a bulk token from the tenant administrator client machine, obtaining the bulk token from the directory service, receiving an identifier of an authorized tenant client of the cloud hosted tenant service, provisioning a tenant client virtual machine in a cloud service for the authorized tenant client in accordance with a specified provisioning package associated with the bulk token, and joining the tenant client virtual machine to the directory service.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   granting a tenant administrator client machine access to a cloud hosted tenant service joined to a directory service;
   receiving, at the cloud hosted tenant service, a request for a bulk token, the request being received from the tenant administrator client machine;
   obtaining, in response to the request, the bulk token from the directory service;
   obtaining, at the cloud hosted tenant service, an identifier of an authorized tenant client of the cloud hosted tenant service;
   provisioning, in response to obtaining the identifier of the authorized tenant client, a tenant client virtual machine in a cloud service for the authorized tenant client in accordance with a specified provisioning package associated with the bulk token; and
   joining, in response to the provisioning, the tenant client virtual machine to the directory service.

2. The method of claim 1 and further comprising:
   receiving an authorized tenant client token at the cloud hosted tenant service from a tenant client machine; and
   granting the tenant client machine a connection to the client virtual machine.

3. The method of claim 2 wherein the tenant client token comprises the identifier and a password.

4. The method of claim 1 wherein the tenant client virtual machine is managed within the cloud service.

5. The method of claim 1 wherein the directory service authenticates and authorizes access based on tokens.

6. The method of claim 1 wherein the bulk token comprises a unique binary string.

7. The method of claim 1 and further comprising:
   receiving multiple additional identifiers, each identifier corresponding to a respective one of multiple additional authorized tenant clients of the cloud hosted tenant service;
   provisioning multiple additional respective tenant client virtual machines in the cloud service in accordance with a specified provisioning package associated with the bulk token; and
   joining the tenant client virtual machines to the directory service.

8. The method of claim 1 wherein the bulk token is encrypted within the cloud hosted tenant service.

9. The method of claim 1 wherein the provisioning package includes the bulk token.

10. The method of claim 1 wherein receiving an identifier of an authorized tenant client of the cloud hosted tenant service is performed in response to a tenant client being confirmed as having a license to services in the specified provisioning package.

11. The method of claim 10 wherein the authorized tenant client comprises a device providing an authorized tenant client token of a user included in the license.

12. The method of claim 11 wherein the device is coupled to a portal website providing access to the cloud hosted tenant service.

13. The method of claim 1 wherein joining the tenant client virtual machine to the directory service comprises providing a connection between the client virtual machine and the directory service for providing directory service functions to the tenant client virtual machine.

14. A machine-readable storage device having instructions for execution by a processor of a machine to cause the processor to perform operations, the operations comprising:
   granting a tenant administrator client machine access to a cloud hosted tenant service joined to a directory service;
   receiving, at the cloud hosted tenant service, a request for a bulk token, the request being received from the tenant administrator client machine;
   obtaining, in response to the request, the bulk token from the directory service;
   obtaining, at the cloud hosted tenant service, an identifier of an authorized tenant client of the cloud hosted tenant service;
   provisioning, in response to obtaining the identifier of the authorized tenant client, a tenant client virtual machine in a cloud service for the authorized tenant client in accordance with a specified provisioning package associated with the bulk token; and
   joining, in response to the provisioning, the tenant client virtual machine to the directory service.

15. The device of claim 14 wherein the operations further comprise:
   receiving an authorized tenant client token at the cloud hosted tenant service; and
   granting the authorized tenant client a connection to the client virtual machine.

16. The device of claim 14 wherein the directory service authenticates and authorizes access based on tokens, wherein the directory service manages storage of information and deployment of services and wherein the bulk token comprises a unique binary string.

17. The device of claim 14 wherein the operations further comprise:

receiving multiple additional identifiers, each identifier corresponding to a respective one of multiple additional authorized tenant clients of the cloud hosted tenant service;

provisioning multiple additional respective tenant client virtual machines in the cloud service in accordance with a specified provisioning package associated with the bulk token; and joining the tenant client virtual machines to the directory service.

18. The device of claim 14 wherein the provisioning package includes the bulk token, wherein receiving an identifier of an authorized tenant client of the cloud hosted tenant service is performed in response to a tenant client being confirmed as having a license to services in the specified provisioning package, wherein the authorized tenant client comprises a device providing the authorized tenant client token of a user included in the license, and wherein the device is coupled to a portal website providing access to the cloud hosted tenant service.

19. The device of claim 14 wherein joining the tenant client virtual machine to the directory service comprises providing a connection between the client virtual machine and the directory service for providing directory service functions to the tenant client virtual machine.

20. A device comprising:

a processor; and a memory device coupled to the processor and having a program stored thereon for execution by the processor to perform operations comprising:

granting a tenant administrator client machine access to a cloud hosted tenant service joined to a directory service;

receiving, at the cloud hosted tenant service, a request for a bulk token, the request being received from the tenant administrator client machine;

obtaining, in response to the request, the bulk token from the directory service;

obtaining, at the cloud hosted tenant service, an identifier of an authorized tenant client of the cloud hosted tenant service;

provisioning, in response to obtaining the identifier of the authorized tenant client, a tenant client virtual machine in a cloud service for the authorized tenant client in accordance with a specified provisioning package associated with the bulk token; and joining, in response to the provisioning, the tenant client virtual machine to the directory service.

\* \* \* \* \*